(12) United States Patent
Farjon et al.

(10) Patent No.: US 12,316,671 B2
(45) Date of Patent: May 27, 2025

(54) DETECTION OF IMPERSONATED WEB PAGES AND OTHER IMPERSONATION METHODS FOR WEB-BASED CYBER THREATS

(71) Applicant: Mimecast Israel Ltd., Tel Aviv (IL)

(72) Inventors: Meni Farjon, Tel Aviv (IL); Yossi Sara, Rishon Le'Tsiyon (IL); Boris Vaynberg, Netanya (IL); Roi Panai, Ramat Gan (IL); Ido Bukra, Netanya (IL); Tomasz Kojm, Torun (PL); Jackie Maylor, London (GB)

(73) Assignee: Mimecast Israel Ltd, Tel Aviv (IL)

(*) Notice: Subject to any disclaimer, the term of this patent is extended or adjusted under 35 U.S.C. 154(b) by 434 days.

(21) Appl. No.: 17/308,323

(22) Filed: May 5, 2021

(65) Prior Publication Data

US 2022/0174092 A1 Jun. 2, 2022

Related U.S. Application Data

(60) Provisional application No. 63/119,678, filed on Dec. 1, 2020.

(51) Int. Cl.
*H04L 9/40* (2022.01)
*G06F 40/221* (2020.01)

(52) U.S. Cl.
CPC ........ *H04L 63/1483* (2013.01); *G06F 40/221* (2020.01); *H04L 63/0823* (2013.01)

(58) Field of Classification Search
CPC .... G06F 21/51; G06F 21/577; G06F 21/6218; G06F 2221/033; G06F 2221/2119; G06F 40/221; H04L 63/0823; H04L 63/123; H04L 63/1483; H04L 67/02
See application file for complete search history.

(56) References Cited

U.S. PATENT DOCUMENTS

| | | | |
|---|---|---|---|
| 8,990,933 B1* | 3/2015 | Magdalin | G06F 21/85 709/229 |
| 10,904,286 B1* | 1/2021 | Liu | H04L 9/3236 |
| 11,089,055 B1* | 8/2021 | Sadovyi | G06Q 20/085 |
| 11,146,576 B1* | 10/2021 | Mushtaq | H04L 63/1425 |
| 11,496,510 B1* | 11/2022 | Orhan | H04L 63/1483 |
| 11,736,521 B2 | 8/2023 | Tyler et al. | |

(Continued)

*Primary Examiner* — Theodore C Parsons
(74) *Attorney, Agent, or Firm* — Soquel Group I.P Ltd (57) ABSTRACT

Identifying a malicious web page that impersonates a legitimate web page, including extracting HMTL source and a certificate for a specified web page, parsing the extracted HTML to identify objects, forms, links, templates, images and logos embedded in the HTML, and determining whether or not the HTML source harvests user credentials. If the determining is negative, then marking the specified web page as clean. If the determining is affirmative, then verifying the origin and ownership of the extracted certificate by examining its digital signature to determine a possibility of an impersonation attempt, applying image recognition to the identified images and logos, and comparing the identified images and logos to known images and brand logos of the certificate owner. If the comparing is affirmative, then mark the web page as clean. If the comparing is negative, then mark the web page as suspicious and block the web page from being accessed.

19 Claims, 9 Drawing Sheets

(56) References Cited

U.S. PATENT DOCUMENTS

| | | | |
|---|---|---|---|
| 2009/0119402 A1* | 5/2009 | Shull | H04L 61/30 |
| | | | 709/224 |
| 2014/0201844 A1* | 7/2014 | Buck | G06F 21/554 |
| | | | 726/26 |
| 2019/0373002 A1* | 12/2019 | Mushtaq | H04L 63/1416 |
| 2020/0036751 A1* | 1/2020 | Kohavi | H04L 63/1416 |
| 2020/0358819 A1* | 11/2020 | Bowditch | G06F 17/18 |
| 2021/0026977 A1* | 1/2021 | Shivakumar | H04L 63/168 |
| 2021/0037006 A1* | 2/2021 | Belenko | G06F 21/563 |
| 2021/0149957 A1* | 5/2021 | Grossman | H04L 61/3025 |
| 2021/0320946 A1* | 10/2021 | Boshmaf | H04L 63/0823 |
| 2024/0064171 A1 | 2/2024 | Tyler et al. | |

\* cited by examiner

```
┌─────────────────────────────────────────────────────────────┐
│ EXAMINE A REFERRAL TO A LOGIN PAGE, THE REFERRAL APPEARING  │
│ TO BELONG TO A LEGITIMATE OWNER, AS INFERRED FROM LOGOS OF  │──1705
│ THE LEGITIMATE OWNER THAT APPEAR IN THE REFERRAL OR FROM A  │
│    CERTIFICATE BEARING THE NAME OF THE LEGITIMATE OWNER     │
└─────────────────────────────────────────────────────────────┘
                              │
                              ▼
┌─────────────────────────────────────────────────────────────┐
│   COMPARE EXAMINED REFERRAL TO A LIST OF KNOWN REFERRALS    │──1710
│            THAT ARE USED BY THE LEGITIMATE OWNER            │
└─────────────────────────────────────────────────────────────┘
                              │
                              ▼                                  ─1715
         ╱‾‾‾‾‾‾‾‾‾‾‾‾‾‾‾‾‾‾‾‾‾‾‾‾‾‾‾‾‾‾‾‾‾‾‾‾‾‾‾‾‾╲
        (  DOES REFERRAL MATCH ONE OF THE KNOWN REFERRALS?  )
         ╲___________________________________________╱
                              │
              1720            │ NO
                ╲             ▼
              ┌──────────────────┐
              │ ISSUE WARNING THAT│
              │ THE REFERRAL IS A │
              │   PHISHING URL    │
              └──────────────────┘
```

FIG. 9

DETECTION OF IMPERSONATED WEB PAGES AND OTHER IMPERSONATION METHODS FOR WEB-BASED CYBER THREATS

PRIORITY REFERENCE TO PROVISIONAL APPLICATION

This application claims benefit of and hereby incorporates by reference U.S. Provisional Application No. 63/119,678, entitled DETECTION OF LOOK-ALIKE WEB PAGES AND IMPERSONATION ATTEMPTS FOR WEB-BASED CYBER THREATS, and filed on Dec. 1, 2020 by inventors Meni Farjon, Yossi Sara, Boris Vaynberg, Roi Panai and Ido Bukra.

This application is related to the following patents.

Tyler et al., U.S. Pat. No. 9,467,435, entitled ELECTRONIC MESSAGE THREAT PROTECTION SYSTEM FOR AUTHORIZED USERS;

Maylor et al., U.S. Pat. No. 10,728,239, entitled MEDIATED ACCESS TO RESOURCES;

Maylor et al., U.S. Pat. No. 10,536,449, entitled USER LOGIN CREDENTIAL WARNING SYSTEM;

Maylor et al., US Publication No. 2020/0186514 A1, entitled USER LOGIN CREDENTIAL WARNING SYSTEM;

Tyler et al., US Publication No. 2020/0137110 A1, entitled SYSTEMS AND METHODS OR THREAT DETECTION AND WARNING;

Maylor et al., US Publication No. 2020/0358798 A1, entitled SYSTEMS AND METHODS FOR MEDIATING ACCESS TO RESOURCES;

Maylor et al., U.S. Pat. No. 9,654,492, entitled MALWARE DETECTION SYSTEM BASED ON STORED DATA; and Maylor et al., U.S. Pat. No. 10,764,316, entitled MALWARE DETECTION SYSTEM BASED ON STORED DATA.

FIELD OF THE INVENTION

The invention relates to computer security, more particularly, to detection of impersonated web pages, that are designed and programmed to mimic another entity.

BACKGROUND OF THE INVENTION

For almost as long as people have used computer systems and networks, malware has existed attempting to compromise, subvert and damage these systems. In the beginning, viruses and worms spread through infected floppy disks and security holes in server-based applications.

With the rise of email and the web, cyber-attacks spread mainly through email and websites—a common way to trick users into providing their credentials or installing malware on their systems.

Back in the early to mid-1990s, the only Internet option was 'dial-up' access for a fee. For those that were reluctant to pay for Internet access, the alternative was a thirty-day free trial to access the Internet via an AOL floppy disk. Rather than face life without the Internet after the trial period expired, some found a way to change their screen names to make it appear as if they were AOL administrators. Using these phony screen names, they would "phish" for log-in credentials to continue accessing the Internet for free.

As Internet use increased in popularity, scammers adapted these tactics to disguise themselves as administrators from an ISP, emailing the accounts of the ISP's customers to elicit user login credentials. Having spoofed someone, the hacker could access the Internet from that user's account with the bonus of sending spam from the user's email address.

A change in tactics saw the world fall victim to the Love Bug on May 4, 2000. Starting in the Philippines, mailboxes around the globe were filled with a message titled "ILOVEYOU". The message body simply said "Kindly check the attached LOVELETTER coming from me".

Many users around the globe opened what they thought was a harmless .txt file, only to unleash a worm that did damage on the local machine. The worm overwrote image files and sent a copy of itself to all the user's contacts in their Outlook address book.

"LoveBug" showed how to get spam to send itself and that, with a cleverly designed virus that preyed on human psychology and technical failings, malware could rack up enormous numbers of victims. In all, about 45 million Windows PCs were thought to have been hit.

The history of phishing shows that, although delivery methods have evolved over two decades to evade detection by spam filters and other technology, the tactics employed by phishers have remained fairly consistent. It would seem logical that people should have learned to avoid the trap of surrendering login credentials, clicking links or even opening attachments. Yet this is still an effective tactic for hackers.

While the phishing attackers' tactics may not have changed, the stakes have. Now, instead of getting free Internet access, phishing scams can wreak havoc on the world economy. Nowadays there is no need to put in the work to break through a firewall, when a well-crafted phishing email can be just as effective in giving the hacker access to sensitive information.

One key development has been the rise of social media. As previously mentioned, just 10 years ago there was little to no information available over the Internet about organizations and the people who worked for them. Today, almost everyone at every organization has a LinkedIn, Facebook, or Twitter account; some have all three.

While a key business tool, these social media sites offer a veritable gold mine of personal information that criminals can, and do, use to personalize emails to specific recipients—a practice known as spear phishing.

The amount of information a criminal can find about a company just through LinkedIn is enormous. Using that as a starting point, the hacker can then delve deeper into the personal lives of targets through Facebook and Twitter.

An email coming from a (seemingly) familiar or authoritative source, dealing with a relevant topic puts the recipient at ease. Personalized details only add to the authenticity and peace of mind the recipient experiences, making the likelihood of interaction with the links, only to then see a seemingly authentic web-site, pretending to be of a trustworthy entity, asking the user to log-in to their sensitive accounts, whether it's their email account, banking account or social media.

The stakes, coupled with the minimal resources required to execute an attack, have made spear phishing the choice for criminals seeking access to the sensitive data stored on the networks of large organizations and corporations. Target, Home Depot and Anthem are just three of the latest high-profile breaches that are believed to have started with an employee falling victim to spear phishing.

And while vendors continually try to hunt and take down phishing emails and web-sites, they are usually well behind the bad guys. Today, phishing attacks are one of the most common ways for an attacker to penetrate individual and organization properties.

SUMMARY

Methods are described for detecting impersonated web pages, that are designed and programmed to mimic another entity. These methods combine multiple techniques to validate ownership of a given web page, in order to determine possible malicious impersonation of a trustworthy entity by examining the web page, including validating required user credentials input, extracting and validating images and logos from the web page, analyzing web site behavior to identify an impersonated entity, using specially crafted image similarity checks, verifying the origin and ownership of the web page by examining its digital signature and certificate, and checking a behavioral fingerprint to successfully determine the possibility of an impersonation attempt.

The method and the system of this method centers around the innovative concept of identifying login-required and sensitive data inputs present in a web site, combined with methods of identifying impersonated web site identity and verifying the true identity using pieces of data extracted from the web site's registration data, digital ownership and digital certificate of the web site.

The system and the methods of the system include a static-analysis engine, capable of parsing and extracting source code and HTML code of a web-site, including dynamic content, and analyze every object in the page and sub-pages, embedded frames and external JavaScript, using lexical analysis, dissecting the code into tokens, in order to identify possible login-forms or sensitive data inputs required from the user. Login forms and sensitive data inputs include but are not limited to: email addresses, passwords, login IDs, credit card information, home addresses, phone numbers, smart token IDs and more.

The system and the methods of the system include a dynamic analysis engine, and a behavioral analysis engine capable of analyzing behavior of the web site and generating one or more behavioral fingerprints.

By identifying possible required sensitive inputs in a web page and behavior of the web site, the system determines a potential risk to a user by providing the sensitive data to an unidentified website, to then begin with verifying the ownership of the web-site.

Provided the fact that phishing attacks impersonate a trustworthy entity, the similarity of the impersonation, look-alike phishing web page contains artifacts of which can be contained within the real, impersonated web site, the system and the methods of the system may list potential impersonated entities and identification of those entities. The system may then compare the digital ownership of the look-alike page, versus the details of the impersonated, trustworthy web site and determine possible impersonation phishing attempt.

Using a database of images and logos fetched from legitimate, trustworthy entities, the system identifies and learns these images to classify those for a specific brand.

The system and the methods of the system may include one or more image recognition methods, designed specifically for the task of identifying brand logos and images, using supervised machine learning to recognize one or more concepts in an image, training the system based on those artifacts with the goal to learn a similarity function that measures how similar or related two images are.

Once the system detects a similarity to a known brand, with significant accuracy stored in the database, the system links between the possibly impersonated brand to the one displayed in the website being analyzed, checking the domain registration information, digital ownership documents and digital certificate in an attempt to detect mismatches between the analyzed web site and its real, possibly impersonated web-site identity information.

The system matches information stored in the real website versus the analyzed website. This information contains but is not limited to the Digital Certificate's validity, mathematical hash, DNS information, Subject Name, Subject Alternative Name, Certificate Chain, Date of Issuance and more. This data is stored on both the analyzed web site and the real, possibly impersonated web site and are used in the analysis to determine possible mismatches that may conclude to detection of a look-alike, phishing webpage.

There is thus provided in accordance with an embodiment of the present invention a system for identifying a malicious web page that impersonates a legitimate web page, including a parser extracting HMTL source and a certificate for a web page intended for access by a user via a web browser, and parsing the extracted HTML source to identify (i) at least one of objects, forms, links and templates embedded in the HTML source, and (ii) at least one of images and logos embedded in the HTML source, a sensitive-input detector determining whether or not the HTML source harvests user credentials, based on the at least one of the objects, forms links and templates identified by the parser, a certificate validator validating the certificate extracted by the parser, to determine a possibility of an impersonation attempt, a data storage storing known images and brand logos of legitimate owners, and certificates associated with the legitimate owners, a logo detector matching the at least one of the images and logos identified by the parser, with the known images and brand logos of legitimate owners in the data storage, and an ownership validator comparing a certificate associated with the legitimate owner with the extracted certificate, for each image or logo matched by the logo detector.

There is additionally provided in accordance with an embodiment of the present invention a method for identifying a malicious web page that impersonates a legitimate web page, including extracting HMTL source and a certificate for a specified URL of a web page intended for access by a user via a web browser, parsing the extracted HTML source to identify objects, forms, links, images and logos embedded in the HTML, determining whether or not the HTML harvests user credentials, based on the objects, forms and embedded links identified by the parsing, if the determining is negative, then enabling the web page of the URL to be accessed, if the determining is affirmative, then validating the extracted certificate to determine the possibility of an impersonation attempt, if the validating fails, then blocking the web page of the URL from being accessed, if the validating is successful, then matching the identified image and logos with known images and brand logos of known owners, for each matched image or brand logo, comparing the certificate associated with the known owner with the extracted certificate, if the comparing is affirmative for at least one known owner, then enabling the web page of the URL to be accessed, and if the comparing is negative for all matched know images and brand logos, then blocking the web page of the URL from being accessed.

There is further provided in accordance with an embodiment of the present invention a method for identifying a malicious web page that impersonates a legitimate web page, including extracting HMTL source for a specified URL of a web page intended for access by a user via a web browser, wherein the web page is expected to belong to a legitimate owner, parsing the extracted HTML to identify the template of the HTML and links embedded in the HTML, via a parse tree structure of HTML and objects in the web page, determining whether or not the HTML includes a sign-in page, based on the identified template, if the determining is negative, then enabling the web page of the URL to be accessed, if the determining is affirmative, then comparing the embedded links of the HTML to a list of domains and IP addresses of the legitimate owner, if the comparing is negative for at least one embedded link, then blocking the web page of the URL from being accessed, and if the comparing is affirmative for all embedded links, then enabling the web page of the URL to be accessed.

There is yet further provided in accordance with an embodiment of the present invention a method for identifying a malicious web page that impersonates a legitimate web page, including examining the behavior of a web site, the behavior including a path of links followed by a user to reach a login page of a website that is expected to belong to a legitimate owner, as inferred from logos of the legitimate owner that appear in the web page or from a web page certificate that bears the name of the legitimate owner, comparing the examined web site behavior to behaviors for known web sites of the legitimate owner, if the comparing is affirmative for at least one known website, then enabling the web site to be accessed, and if the comparing is negative for known websites, then blocking the web site from being accessed.

There is moreover provided in accordance with an embodiment of the present invention a method for identifying a malicious web page that impersonates a legitimate web page, including examining the behavior of a web site, the behavior including a path of links followed by a user to reach a login page of a website that is expected to belong to a legitimate owner, as inferred from logos of the legitimate owner that appear in the web page or from a web page certificate that bears the name of the legitimate owner, comparing the examined web site behavior to behaviors for known web sites of the legitimate owner, if the comparing is affirmative for at least one known website, then enabling the web site to be accessed, and if the comparing is negative for known websites, then blocking the web site from being accessed.

There is additionally provided in accordance with an embodiment of the present invention a method for identifying a malicious web page that impersonates a legitimate web page, including examining a referral to a login page, the referral including a URL that is re-directed to the login page, the referral appearing to belong to a legitimate owner, as inferred from logos of the legitimate owner that appear in the referral or from a certificate in the referral that bears the name of the legitimate owner, comparing the examined referral to a list of known referrals that are used by the legitimate owner, and if the comparing is negative, then issuing a warning that the referral is a phishing URL.

BRIEF DESCRIPTION OF THE DRAWINGS

The present invention will be more fully understood and appreciated from the following detailed description, taken in conjunction with the drawings in which.

DETAILED DESCRIPTION

Figure 1:
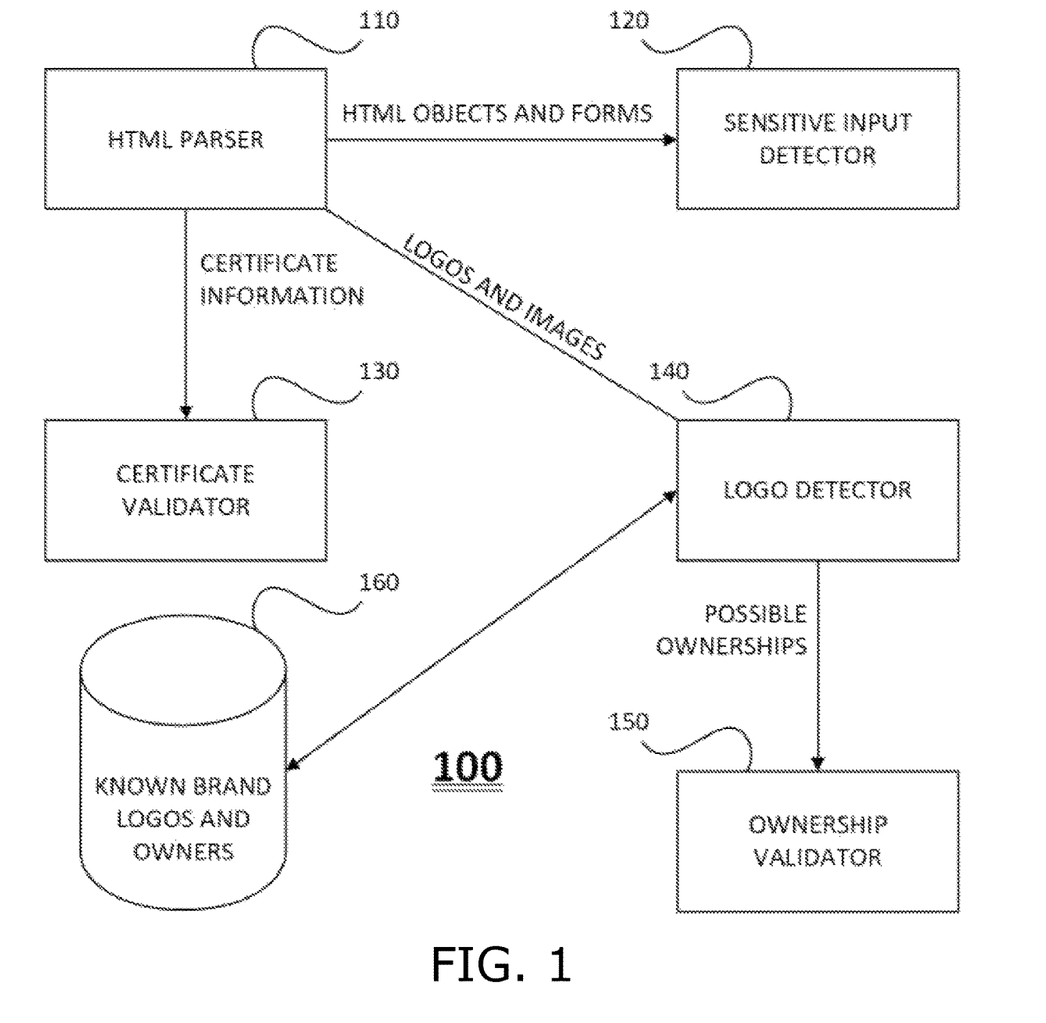
FIG. 1 is a simplified block diagram of a system for detecting an impersonated phishing web page, in accordance with an embodiment of the present invention.

Reference is made to FIG. 1, which is a simplified block diagram of a system 100 for detecting an impersonated phishing web page, in accordance with an embodiment of the present invention. System 100 includes five primary components.

An HTML parser 110 parses HTML source at a URL to identify embedded objects and forms. The thus-identified objects and forms are transmitted to a sensitive input detector 120. In addition, HTML parser 110 extracts information regarding the certificate for the web page accessed by the URL. The thus-extracted certificate information is transmitted to a certificate validator 130. Further, HTML parser 110 identifies embedded logos and images. The thus-identified logos and images transmitted to logo detector 140, which analyzes the logos and images to determine one or more possible owners, and the thus-determined possible owners are transmitted to an ownership validator 150. A database 160 stores known brand logos and images, and their respective owners.

Detailed operation of HTML parser 110, sensitive input detector 120, certificate validator 130, logo detector 140, and ownership validator 150 are described hereinbelow with reference to FIG. 2.

Figure 2:
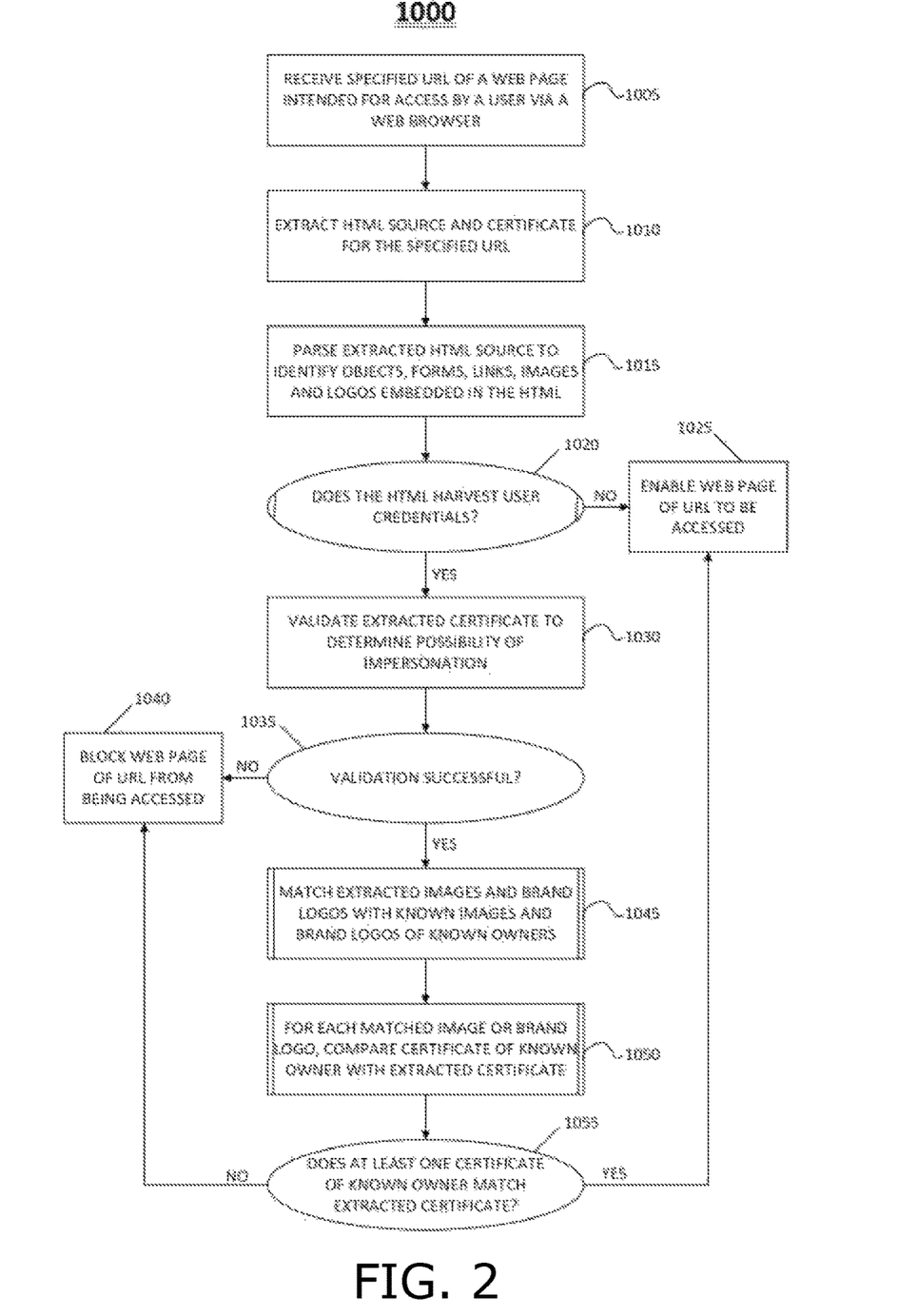
FIG. 2 is a flow chart of a first method for detecting an impersonated phishing web page, performed by the system of FIG. 1, in accordance with an embodiment of the present invention.

Reference is made to FIG. 2, which is a flow chart of a first method 1000 for detecting an impersonated phishing web page, performed by system 100, in accordance with an embodiment of the present invention. Method 1000 begins at operation 1005, at which system 100 downloads HTML code of a specified URL of a web page intended for access by a client via a web browser, and HTML parser 110 receives the downloaded HTML. The HTML code is present and clearly visible in the data stream.

At operation 1010, HTML parser 110 extracts HTML source and a certificate for the specified URL. At operation 1015, HTML parser 110 parses the extracted HTML source to identify objects, forms, links, images, logos, iframes, JavaScript, and CSS embedded in the HTML. Specifically, HTML parser 110 analyzes the HTML statically, using HTML lexical analysis to parse and dissect HTML elements for better searching and indexing of elements for a clearer understanding of elements and objects in the HTML page. The lexical analysis provides a list of all potential objects, forms, embedded links and elements resident in the HTML code of the analyzed website.

At operation 1020, sensitive input detector 120 determines whether or not the HTML harvests user credentials. At operation 1020, using the list provided at operation 1015, sensitive input detector 120 begins searching for potential evidence of required user inputs. Required user inputs may be inter alia usernames, e-mail addresses, passwords, and credit card information. Operation 1020 is described more fully with reference to FIG. 3 below. If, at operation 1020, sensitive input detector 120 determines that the HTML does not harvest user credentials, then at operation 1025, system 100 enables the web page of the URL to be accessed by the client. System 100 marks the web page as potentially clean, and therefore not requiring additional analysis.

If, at operation 1020, sensitive input detector 120 determines that the HTML does harvest user credentials, then at operation 1030 certificate validator 130 validates the extracted the certificate to determine the possibility that the web page is an impersonation. Certificate validator 130 ensures certificate validity, including inter alia certificate expiry date, certificate revoke status, and certificate digital signature authority; i.e., whether the certificate is signed and validated by a trusted certificate authority. At operation 1035, certificate validator 130 determines if the certificate validation is affirmative. If not, then at operation 1040, system 100 marks the web page of the URL as malicious, and blocks access to the web page.

If certificate validator 130 determines at operation 1035 that the validation is affirmative, then at operation 1045 logo detector 140 matches the images and logos extracted at operation 1015 with images and brand logos of known owners. Logo detector 140 uses image recognition artificial intelligence, designed specifically for the task of identifying brand logos and images, using supervised machine learning to recognize one or more concepts in an image, training the system based on those artifacts with the goal of learning a similarity function that measures how similar or related two images are. Operation 1045 is described more fully with reference to FIG. 4 below.

If logo detector 140 detects similarity, with significant accuracy, to a logo previously stored in a database and matches a known brand, then at operation 1050 ownership validator 150 matches the known brand to its stored digital certificate information, to compare stored information, fetched from the real web page, to the certificate from the analyzed web page, to find mismatches of information. This information contains inter alia the digital certificate's validity, mathematical hash, DNS information, subject name, subject alternative name, certificate chain, and date of issuance. This data is stored on both the analyzed web page and the real, possibly impersonated web page, and is used in the analysis to determine possible mismatches that may conclude to detection of a look-alike, phishing web page. Operation 1050 is described more fully with reference to FIG. 5 below.

At operation 1055, ownership validator 150 determines if at least one certificate of a known owner matches the certificate extracted at operation 1015. If so, then processing advances to operation 1025, and system 100 enables the web page of the URL to be accessed by the client. the web page is marked as clean, and no further analysis is required. Otherwise, processing advances to operation 1040, and system 100 blocks access to the web page of the URL, and marks the web page as suspicious.

Figure 3:
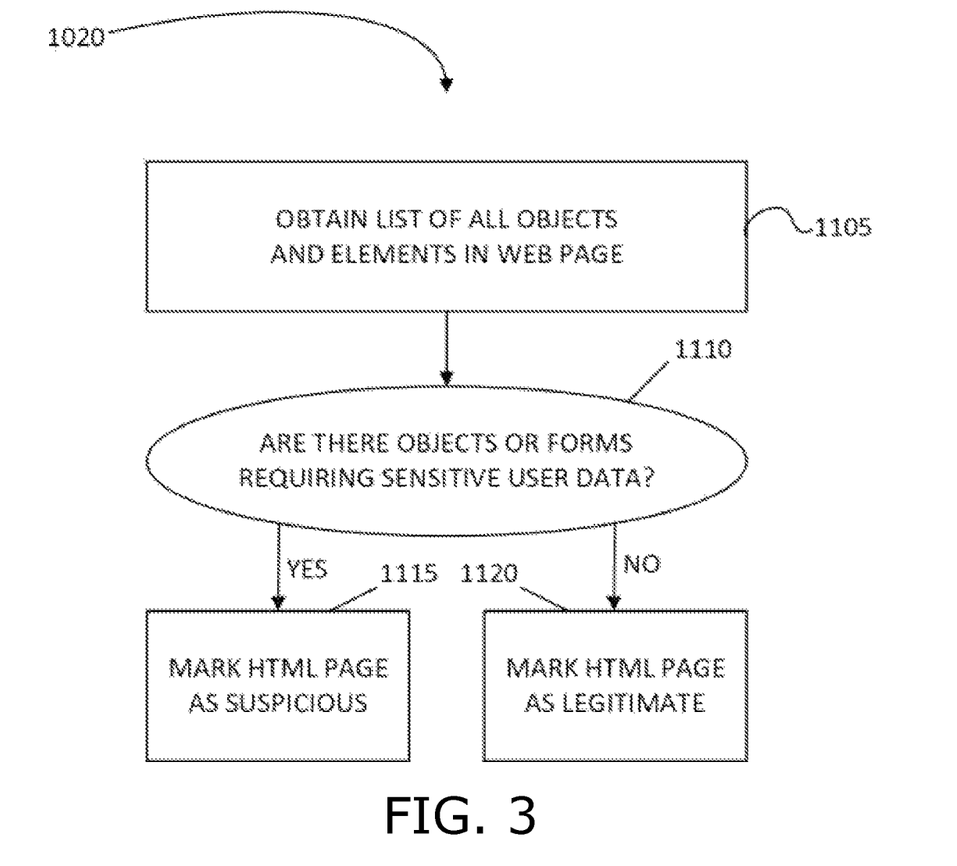
FIG. 3 is a flow chart of a method for determining if an HTML source harvests user credentials, in accordance with an embodiment of the present invention.

Reference is made to FIG. 3, which is a flow chart of operation 1020 of method 1000, performed by input detector 120, in accordance with an embodiment of the present invention. At operation 1105, sensitive input detector 120 obtains, from HTML parser 110, a list of all objects and elements in the web page of the URL. At operation 1110, sensitive input detector 120 determines whether or not there are objects or forms that elicit sensitive user data. If so, then at operation 1115 input detector 120 marks the web page as suspicious. Otherwise, at operation 1120 input detector 120 marks the web page as legitimate.

Figure 4:
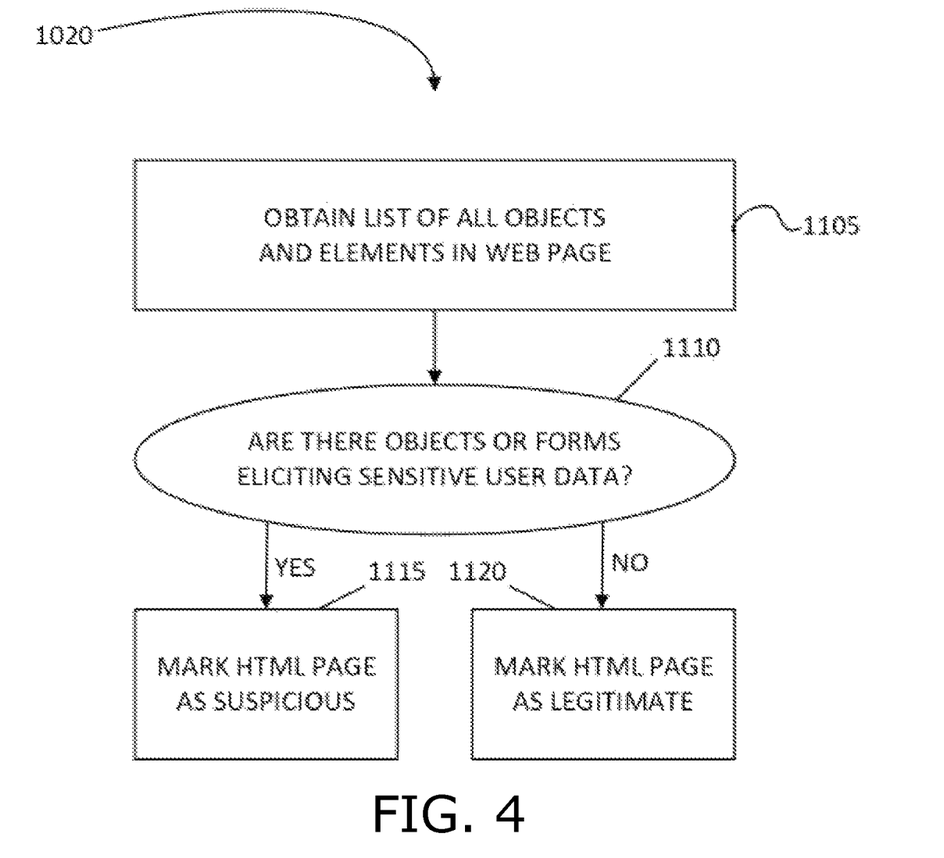
FIG. 4 is a flow chart of a method for matching extracted images and logos with images and logos of known owners, in accordance with an embodiment of the present invention.

Reference is made to FIG. 4, which is a flow chart of operation 1045 of method 1000, performed by logo detector 140, in accordance with an embodiment of the present invention. At operation 1205 logo detector 140 receives a logo from HTML parser 110, which HTML parser 110 extracted from the HTML source. At operation 1210 logo detector extracts features of the logo. At operation 1215, logo detector 140 generates a feature data table. At operation 1220, logo detector 140 builds a feature vector for the logo.

At operation 1225, logo detector 140 determines whether the logo is similar to one or more logos stored in a database of known logos. If not, then at operation 1230 logo detector 140 marks the web page as legitimate. Otherwise, if the determination at operation 1225 is affirmative, then at operation 1235 logo detector 140 marks the web page as potential impersonation, and at operation 1240 logo detector 140 provides a list of possible ownerships based on the results of operation 1225.

Figure 5:
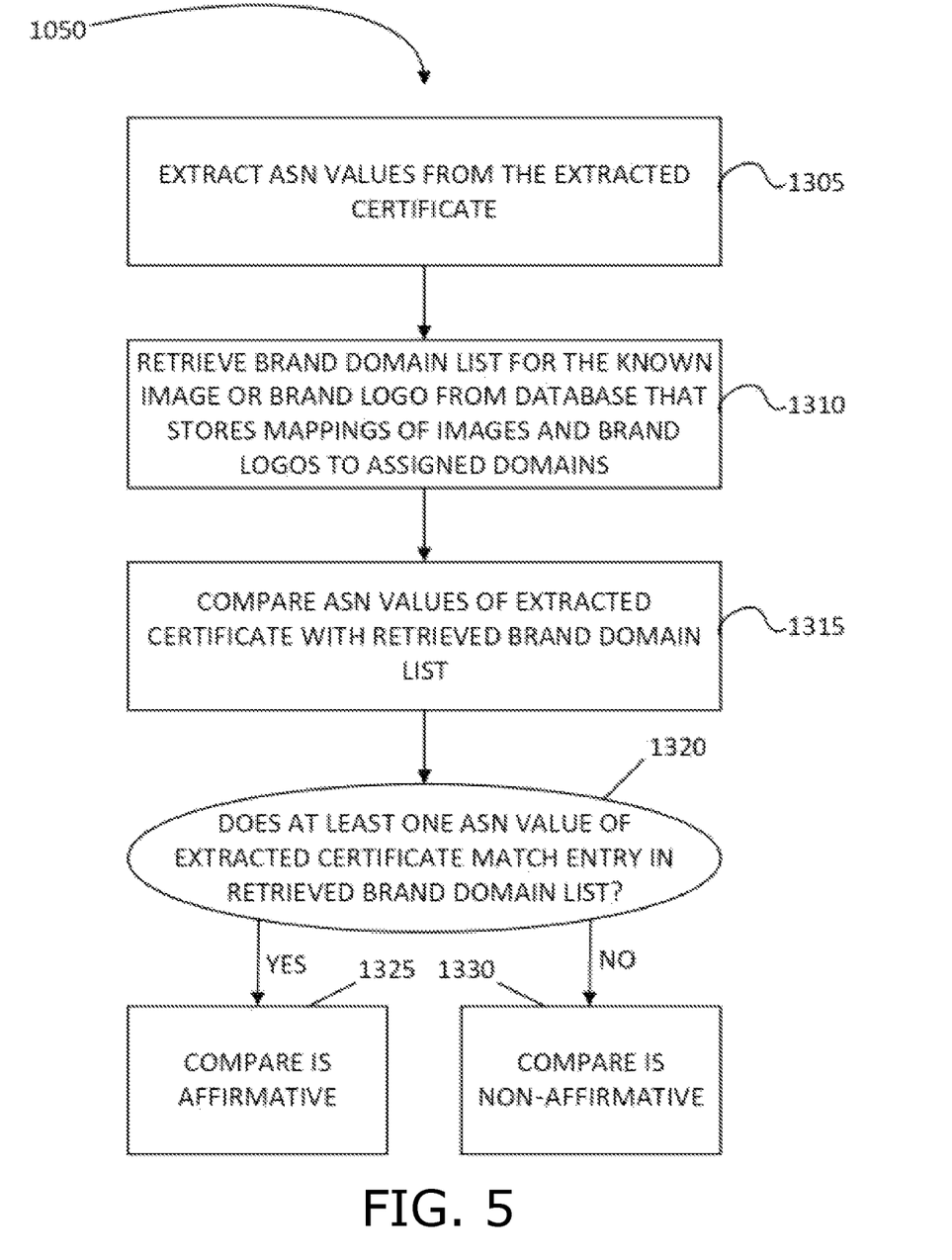
FIG. 5 is a flow chart of a method for recognizing a detected brand, using a certificate file and matching against stored and supported brands and logos for detecting a mismatch of ownership information of a web site, performed by a system of the present invention in accordance with an embodiment of the present invention.

Reference is made to FIG. 5, which is a flow chart of operation 1050 of method 1000, performed by ownership validator 150, in accordance with an embodiment of the present invention. At operation 1305, ownership validator 150 receives a certificate file from the analyzed website, and recognizes brand information revealed at operation 1145 by logo detector 140. Ownership validator extracts certificate information from the certificate file, including inter alia the certificate's alternative subject name (ASN) to be used in the matching process. At operation 1310, ownership validator performs a database 160 look-up of the detected brand revealed by logo detector at operation 1045. The look-up maps each brand to its sub-domains owned by the original owner of the original website, previously stored in database 160. At operation 1315, ownership validator 150 compares the ASN and other certificate information with the list returned from database 160 lookup of the brand's owned domains.

At operation 1320, ownership validator 150 determines if one or more of the domains or sub-domains stored in database 160 match the name in the certificate of the analyzed web site. If so, then at operation 1325 the compare is designated as being affirmative. The web page is considered original and authentic, belonging to the real owner, and system 100 allows traffic to the web page. Otherwise, if no values stored in database 160 map to the detected brand, then at operation 1330 the compare is designated as being non-affirmative. The web page is considered impersonating and therefore potentially suspect as a phishing web page.

Figure 6:
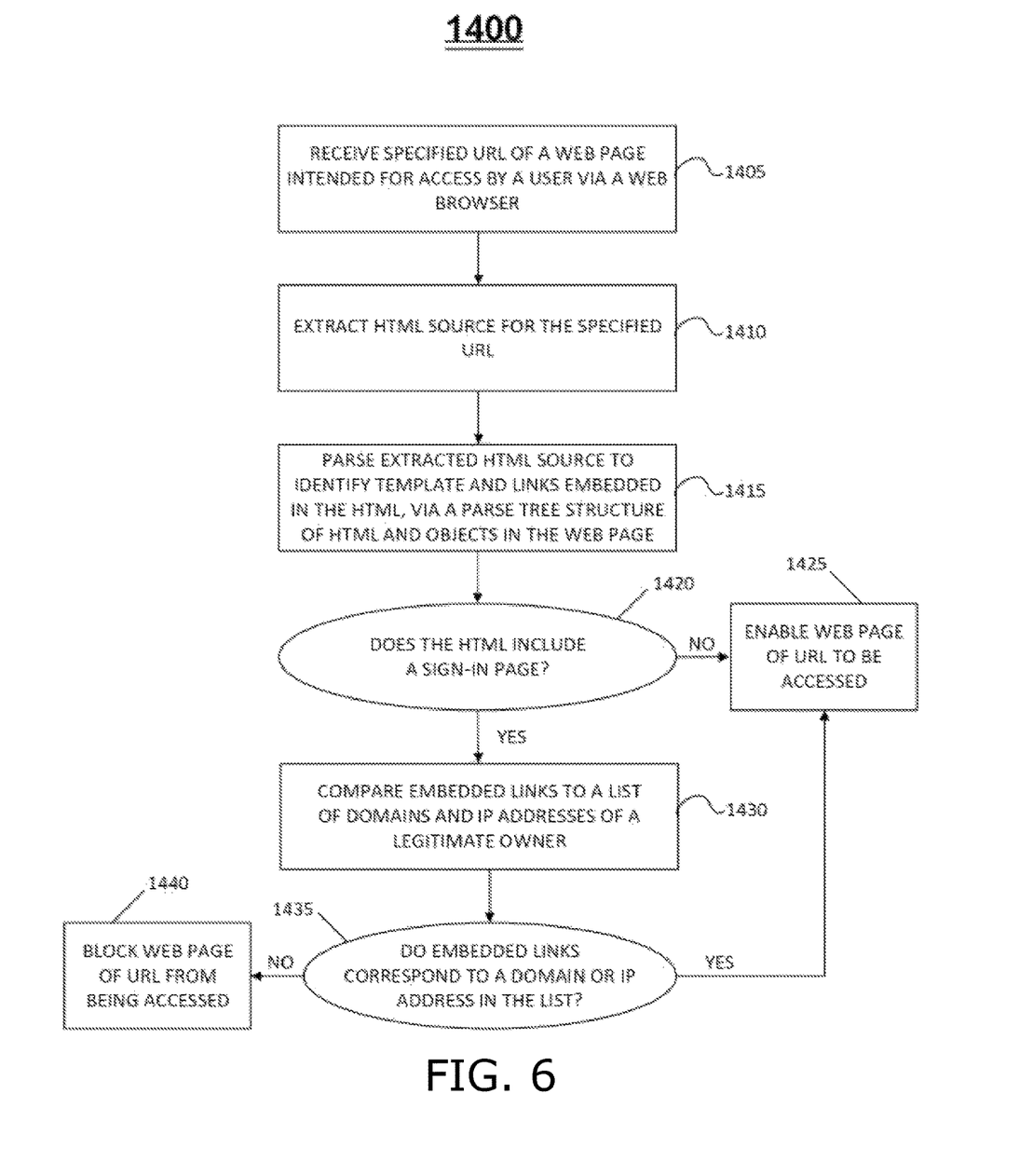
FIG. 6 is a flow chart of a second method for detecting an impersonated phishing web page, performed by a system of the present invention in accordance with an embodiment of the present invention.

Reference is made to FIG. 6, which is a flow chart of a second method 1400 for detecting a look-alike, phishing web page, performed by system 100 in accordance with an embodiment of the present invention.

Method 1400 is based on the observation that phishing attempts use almost the same template as the original site (same CSS, pointing to the same URLs with graphics) but add additional custom code to submit credentials to malicious hosts. Given that official sites usually only link to their own approved URLs/IPs (in some cases vendors publish detailed lists of those), crafted pages may be detected by identifying submission of credentials to non-approved URLs/IPs.

Specifically, a crafted page may be detected by recognizing whether the page looks like a known sign-in page, such as Office 365°, LinkedIn®, Facebook®, and popular banks, and by verifying all URLs and search for unknown domains/IPs. If an unknown IP is identified, then the page is (likely) phishing.

For example, for a Microsoft sign in page, method 1400 searches for elements "microsoft_logo.svg", "enter password", "sign-in", and specific CSS. If these elements are found, then the URLs embedded in the pages are compares with domains/IPs listed at "account.live.com", "apis.live.net", "auth.gfx.ms", "login.live.com", etc. If a URL does not belong to the approved list, then the page is reported as phishing.

Another example is a "Log in with Facebook" icon that is commonly used. Typically, such a link takes a user to Facebook's own login page, but a malicious site might mimic such a link to go to their own look-a-like Facebook® sign in page. If the URL is incorrect for the correct login page, then the page is reported as phishing.

Method 1400 begins at operation 1405, at which system 100 receives a specified URL of a web page intended for access by a client via a web browser. At operation 1410, system 100 extracts HTML source for the specified URL. At operation 1415, HTML parser 110 parses the HTML source extracted at operation 1410, and identifies templates and links embedded in the HTML source. The templates are used for identifying sign-in pages, and the links are used to determine where the user credential are transmitted.

At operation 1420, sensitive input detector 120 analyzes the templates identified at operation 1415, and determines whether the HTML source includes a sign-in page. If not, then at operation 1425, system 100 enables the web page of the URL to be accessed by the client. Otherwise, if the HTML source includes a sign-in page, then at operation 1430 system 100 compares the links embedded in the HTML source to a list of domains and IP addresses of legitimate owners.

At operation 1435 system 100 determines if the links embedded in the HTML source correspond to a domain or IP address in the list. If so, then method 1400 advances to operation 1425 and enables the client to access the web page of the URL. Otherwise, if a link embedded in the HTML source fails to correspond to a domain or IP address in the list then method 1400 advances to operation 1440 and the web page of the URL is blocked from being accessed by the client.

Figure 7:
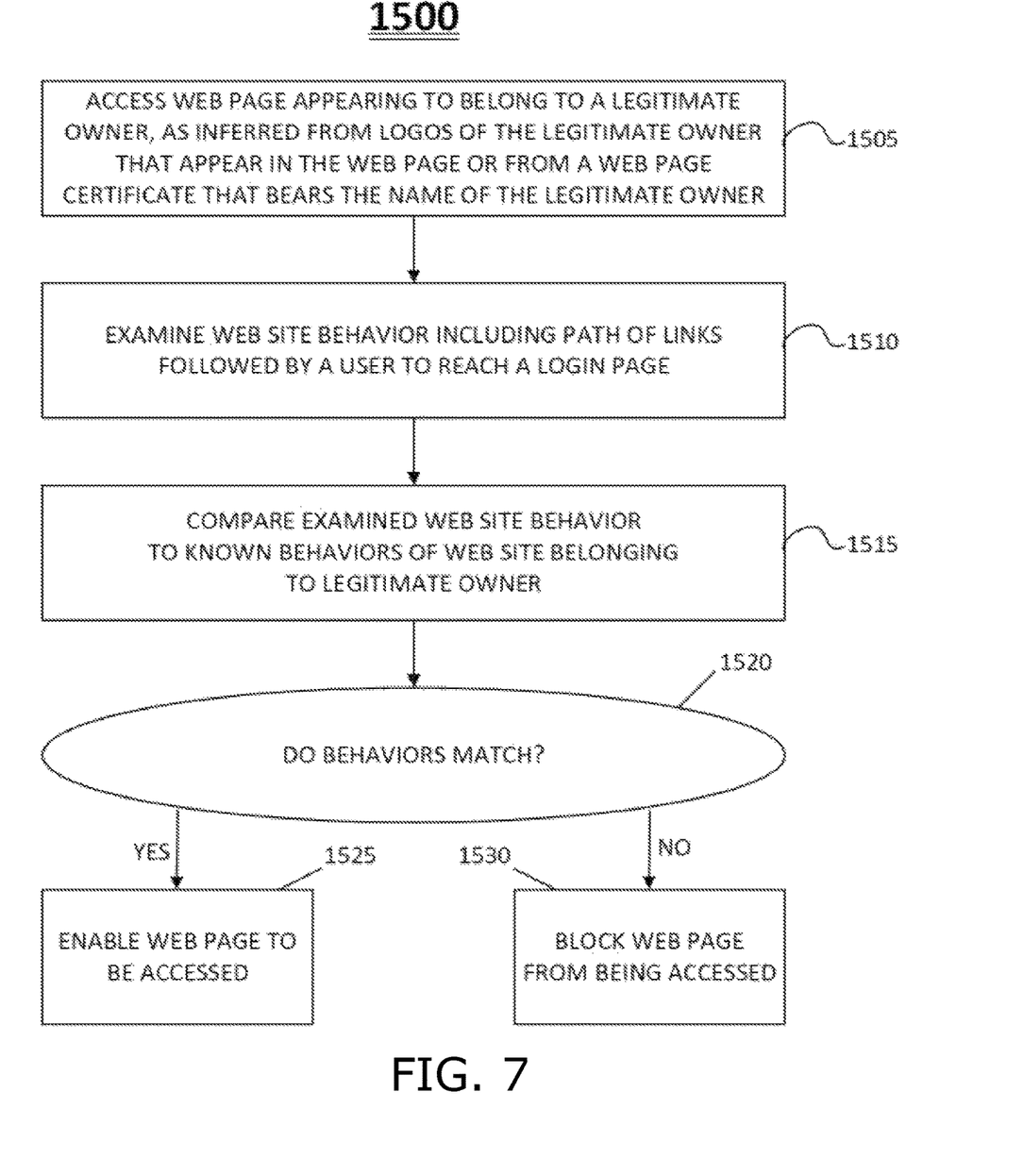
FIG. 7 is a flow chart of a third method for detecting an impersonated phishing web page, performed by a system of the present invention in accordance with an embodiment of the present invention.

Reference is made to FIG. 7, which is a flow chart of a third method 1500 for detecting a look-alike, phishing web page, performed by system 100 in accordance with an embodiment of the present invention.

Method 1500 is based on analysis of web site behavior.

For example, a sign in page commonly asks a user to enter an e-mail address or other identifier initially, and then behaves differently based on that. In some instances a normal login workflow is performed, whereas in other instances the user is taken to a separate third-party login page (typically when a corporate IDP system is used). By analyzing the page behavior that differs from the expected behavior for that web site, the page is reported as phishing.

Another example is page referral or redirection. Some phishing sites deceive a user by redirecting the user to the correct login page or site once the user's credentials have been harvested. In some cases an "incorrect password" error is displayed, while in other more sophisticated cases the user is actually logged in by a malicious site. Such actions are intended to remove any suspicion from the user that the user has been attacked. By analyzing these redirections and referrals it is possible to identify such an attack, and the page is reported as phishing.

At operation 1505 system 100 accesses a web page that appears to belong to a legitimate owner, as inferred from one or more logos of the legitimate owner that appear in the web page, or from a web page certificate that bears the name of the legitimate owner.

At operation 1510 system 100 examines behavior of a web site, the behavior comprising a path of links followed by a user to reach a login page of a website that is expected to belong to a legitimate owner. At operation 1515 system 100 compares the examined web site behavior to behaviors for known web sites of the legitimate owner. At operation 1520 system 100 determines if the examined web site behavior matches the behavior of one of the known web sites. If so, then at operation 1525 system 100 enables the web page to be accessed. Otherwise, at operation 1530 system 100 blocks access to the web page.

Figure 8:
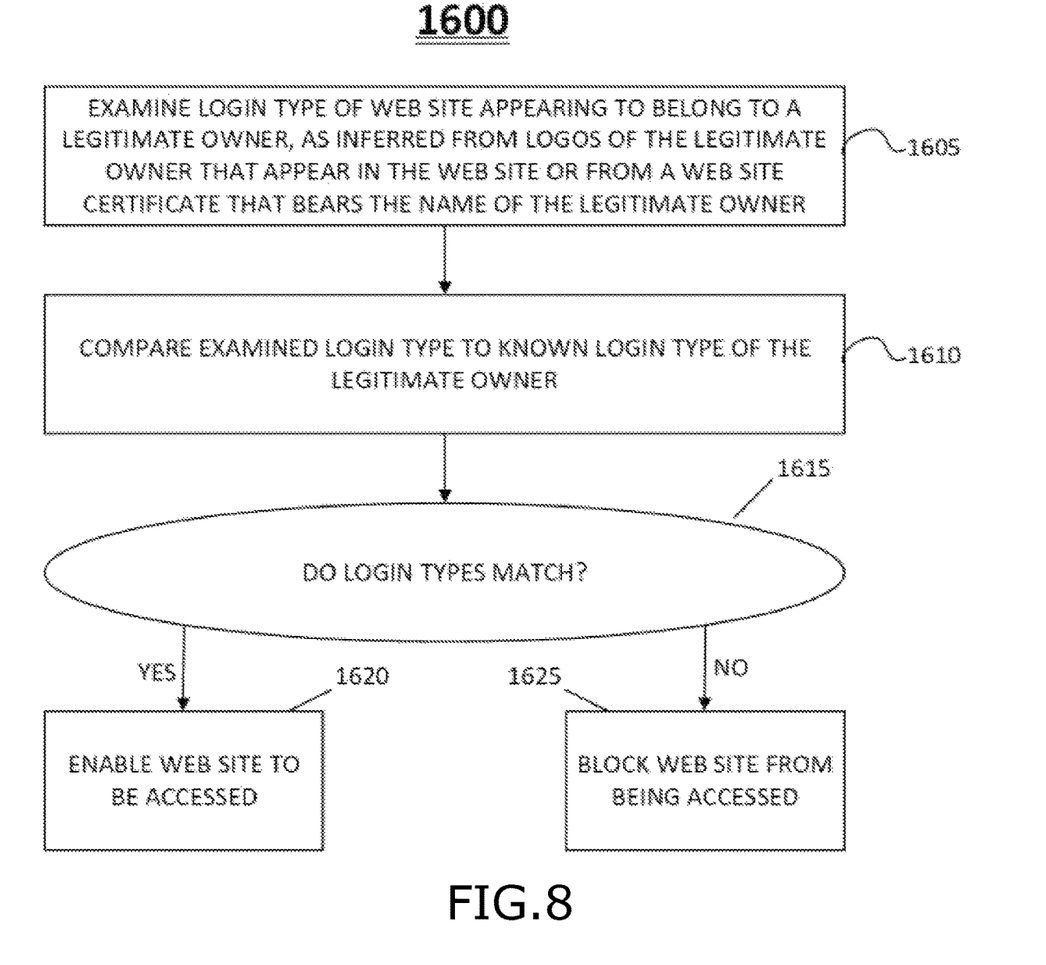
FIG. 8 is a flow chart of a fourth method for detecting an impersonated phishing web page, performed by a system of the present invention in accordance with an embodiment of the present invention.

Reference is made to FIG. 8, which is a flow chart of a fourth method 1600 for detecting an impersonated phishing web page, performed by a system of the present invention in accordance with an embodiment of the present invention. At operation 1605 system 100 examines the behavior of a web site, the behavior including a path of links followed by a user to reach a login page of a web site that is expected to belong to a legitimate owner, as inferred from logos of the legitimate owner that appear in the web page or from a web page certificate that bears the name of the legitimate owner. At operation 1610 system 100 compares the examined web site login type to a known login type of the legitimate owner. At operation 1615 system 100 determines whether or not the login types match. If so, the at operation 1620 system 100 enables the web site to be accessed. If not, then at operation 1625 system 100 blocks access to the web site.

Figure 9:
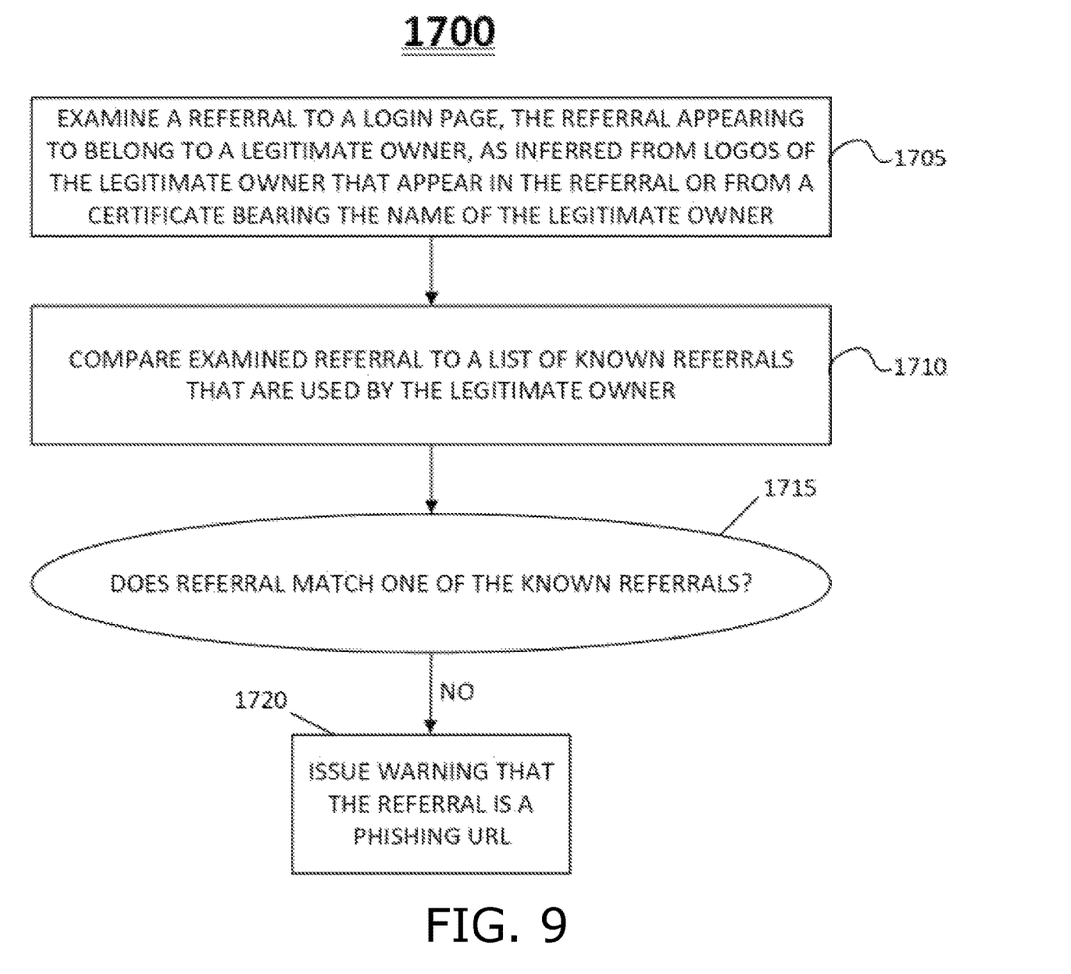
FIG. 9 is a flow chart of a fifth method for detecting an impersonated phishing web page, performed by a system of the present invention in accordance with an embodiment of the present invention.

Reference is made to FIG. 9, which is a flow chart of a fifth method 1700 for detecting an impersonated phishing web page, performed by a system of the present invention in accordance with an embodiment of the present invention. At operation 1705 system 100 examines a referral to a login page, the referral including a URL that is re-directed to the login page, the referral appearing to belong to a legitimate owner, as inferred from logos of the legitimate owner that appear in the referral or from a certificate in the referral that bears the name of the legitimate owner. At operation 1710 system 100 compares the examined referral to a list of known referrals that are used by the legitimate owner. At operation 1715 system 100 determines whether or not the referral examined at operation 1705 matches one of the known referrals. If not, then at operation 1720 system 100 issues a warning that the referral is a phishing URL.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A method for identifying a malicious web page that impersonates a web page of a legitimate owner, comprising:
   extracting HMTL source of a web page intended for access by a user via a web browser;
   statically and lexically analyzing the extracted HTML source to identify at least one of objects, forms, links and templates embedded in the HTML source;
   determining whether or not the HTML source harvests user credentials, based on the at least one of the objects, forms, links and templates identified by said analyzing;
   when said determining is negative, enabling the web page of the URL to be accessed,
   wherein said determining comprises:
     further determining if any of the at least one of the objects, forms, links and templates identified by said analyzing elicit sensitive user data;
     when said further determining is affirmative, indicating an affirmative determination; and
     otherwise, indicating a negative determination,
   further comprising:
   when said determining is affirmative, then:
     extracting a certificate for the web page intended for access;
     validating the extracted certificate to determine a possibility of an impersonation attempt;
     when said validating fails, then blocking the web page intended for access from being accessed;
     when said validating is successful, then:
       parsing the extracted HTML source to identify at least one of images and logos embedded in the HTML source;
       matching the identified image and logos with known images and brand logos of legitimate owners that are stored in a data storage;
       for each matched image or logo, comparing a certificate associated with the legitimate owner with the extracted certificate;
       when said comparing is affirmative for at least one legitimate owner, then enabling the web page intended for access to be accessed; and
       when said comparing is negative for all matched known images and brand logos, then blocking the web page intended for access from being accessed.

2. The method of claim 1, wherein said matching comprises:
   receiving an image or logo identified by said parsing;
   extracting features of the received image or logo;
   generating a feature data table from the extracted features;
   building a feature vector from the feature data table;
   further determining if the identified image or logo is similar to a known image or brand logo, using the feature vector;
   when said further determining is affirmative, then:
     marking the web page intended for access as a potential impersonation; and
     providing a list of possible owners; and
   when said further determining is non-affirmative, then marking the web page intended for access as legitimate.

3. The method of claim 1, wherein said comparing comprises:
   further extracting alternative subject name (ASN) values from the extracted certificate;
   retrieving a domain list for the known image or brand logo from a second data storage that stores mappings of images and brand logos to their assigned domains;
   comparing ASN values of the extracted certificate with the retrieved domain list;
   when said comparing affirms at least one ASN value, then indicating an affirmative compare; and
   otherwise, indicating a non-affirmative compare.

4. The method of claim 3, wherein said retrieving retrieves from the second data storage subdomains of the assigned domains for the known image or brand logo.

5. The method of claim 1 further comprising:
   marking the web page intended for access as being clean, when access to the web page intended for access is enabled; and
   marking the web page intended for access as being suspicious, when access to the web page intended for access is blocked.

6. The method of claim 1, wherein credentials comprise one or more of usernames, email addresses, passwords, social security numbers, and credit card information.

7. The method of claim 1, wherein said validating comprises inspecting one or more of the expiry date, the revoke status, and the signature authority of the extracted certificate.

8. The method of claim 1, wherein said comparing searches for mismatches between one or more of certificate validity, mathematical hash, DNS information, subject name, subject alternative name, certificate chain, and date of issuance, between the extracted certificate and the certificate associated with the known image or brand logo.

9. A method for identifying a malicious web page that impersonates a web page of a legitimate owner, comprising:
   extracting HMTL source of a web page intended for access by a user via a web browser;
   statically and lexically analyzing the extracted HTML source to identify at least one of objects, forms, links and templates embedded in the HTML source;
   determining whether or not the HTML source harvests user credentials, based on the at least one of the objects, forms, links and templates identified by said analyzing;
   when said determining is negative, enabling the web page of the URL to be accessed,
   parsing the extracted HTML source to identify at least one of images and logos embedded in the HTML source;
   extracting a certificate for the web page intended for access;
   examining the behavior of a web site that is expected to belong to a legitimate owner, the legitimate owner being inferred from logos that appear in the web page intended for access, or from a web page certificate that bears the name of the legitimate owner, the behavior comprising a path of links followed by a user to reach a login page of a website;
   comparing the examined web site behavior to behaviors for known web sites of the legitimate owner;
   when said comparing is affirmative for at least one known website of the legitimate owner, then enabling the web page intended for access to be accessed; and
   when said comparing is negative for known websites of the legitimate owner, then blocking the web page intended for access from being accessed.

10. A method for identifying a malicious web page that impersonates a web page of a legitimate owner, comprising:
    extracting HMTL source and a certificate of a web page intended for access by a user via a web browser;

statically and lexically tokenizing the extracted HTML source to identify (i) at least one of objects, forms, links and templates embedded in the HTML source, and (ii) at least one of images and logos embedded in the HTML source;

determining whether or not the HTML source harvests user credentials, based on the at least one of the objects, forms, links and templates identified by said tokenizing;

validating the extracted certificate, to determine a possibility of an impersonation attempt;

matching the at least one of the images and logos identified by said tokenizing, with known images and brand logos of legitimate owners; and comparing a known certificate associated with the legitimate owner with the extracted certificate, for each image or logo matched by said matching.

11. The method of claim 10, wherein said determining comprises:

further determining if any of the at least one of the objects, forms, links and templates identified by said parsing elicit sensitive user data;

when said further determining is affirmative, then indicating an affirmative determination; and otherwise, indicating a negative determination.

12. The method of claim 10, further comprising when said determining is affirmative, then comparing identified links of the HTML source to a list of domains and IP addresses of the legitimate owner, the legitimate owner being inferred from the identified logos, or from the extracted web page certificate.

13. The method according to claim 10, further comprising:

examining the login type of a web site appearing to belong to the legitimate owner, the legitimate owner being inferred from logos that appear in the web site or from a web site certificate that bears the name of the legitimate owner, the login type comprising the type and form of user credentials that are input; and comparing the examined web site login type to a known login type of the legitimate owner.

14. The method of claim 13 wherein a user credential comprises an e-mail address & a password, a token, or a centralized single sign-on.

15. The method of claim 10, further comprising blocking the web page intended for access from being accessed when at least one of (a) the HTML source is determined to harvest user credentials, (b) the extracted certificate is validated as a possible impersonation attempt, (c) the at least one of the identified images and logos does not match with known images or brand logos of legitimate owners, or (d) the known certificate associated with the legitimate owner does not match with the extracted certificate for at least one image or logo matched by said matching.

16. A system for identifying a malicious web page that impersonates a legitimate web page, comprising:

a lexical analyzer extracting HMTL source and a certificate for a web page intended for access by a user via a web browser, and statically and lexically tokenizing the extracted HTML source to identify (i) at least one of objects, forms, links and templates embedded in the HTML source, and (ii) at least one of images and logos embedded in the HTML source;

a sensitive-input detector determining whether or not the HTML source harvests user credentials, based on the at least one of the objects, forms links and templates identified by said lexical analyzer;

a certificate validator validating the certificate extracted by said parser, to determine the possibility of an impersonation attempt;

a data storage storing known images and brand logos of legitimate owners, and certificates associated with the legitimate owners;

a logo detector matching the at least one of the images and logos identified by said lexical analyzer, with the known images and brand logos of legitimate owners in said data storage; and an ownership validator comparing a certificate associated with the owner of the legitimate web page with the extracted certificate, for each image or logo matched by said logo detector.

17. The system of claim 16, wherein credentials comprise personal identification information comprising one or more of usernames, email addresses, passwords, social security numbers, and credit card information.

18. The system of claim 16, wherein said certificate validator inspects one or more of an expiry date, a revoke status, and a signature authority of the certificate extracted by said lexical analyzer.

19. The method of claim 13, further comprising blocking the web page intended for access from being accessed when the examined web site login type does not match a known login type of the legitimate owner.

* * * * *